(12) United States Patent
Yeh et al.

(10) Patent No.: US 11,143,937 B2
(45) Date of Patent: Oct. 12, 2021

(54) SHUTTER ASSEMBLIES FOR ELECTRONIC DEVICES

(71) Applicant: Hewlett-Packard Development Company, L.P., Spring, TX (US)

(72) Inventors: Ya-Ting Yeh, Taipei (TW); Kuan-Ting Wu, Taipei (TW); Shih-Hsun Huang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,509

(22) PCT Filed: Dec. 15, 2017

(86) PCT No.: PCT/US2017/066614
§ 371 (c)(1),
(2) Date: Jul. 29, 2019

(87) PCT Pub. No.: WO2019/117938
PCT Pub. Date: Jun. 20, 2019

(65) Prior Publication Data
US 2021/0286234 A1    Sep. 16, 2021

(51) Int. Cl.
*G03B 11/04* (2021.01)
*G03B 9/08* (2021.01)
*H04N 5/225* (2006.01)
*G06F 1/16* (2006.01)
*G03B 9/58* (2021.01)

(52) U.S. Cl.
CPC .............. *G03B 11/043* (2013.01); *G03B 9/08* (2013.01); *G03B 9/58* (2013.01); *G06F 1/1616* (2013.01); *H04N 5/2254* (2013.01); *H04N 5/2257* (2013.01)

(58) Field of Classification Search
None
See application file for complete search history.

(56) References Cited

U.S. PATENT DOCUMENTS

| 8,279,333 | B2 | 10/2012 | Lee |
| 8,724,020 | B1 | 5/2014 | Haddad |
| 2008/0247750 | A1 | 10/2008 | Law et al. |
| 2009/0002823 | A1 | 1/2009 | Law et al. |
| 2011/0115924 | A1* | 5/2011 | Yu ........................ G03B 11/043 348/207.11 |

(Continued)

FOREIGN PATENT DOCUMENTS

| RU | 2013143946 A | 4/2015 |
| WO | WO-2016153512 | 9/2016 |
| WO | WO-2017055672 A1 | 4/2017 |

OTHER PUBLICATIONS

Intelligent Security | Camera Cover—Webcam Privacy Cover, May 2017, https://www.kickstarter.com/projects/ispaul/intelligent-security-camera-cover-webcam-privacy-c.

(Continued)

*Primary Examiner* — William B Perkey
(74) *Attorney, Agent, or Firm* — HPI Patent Department

(57) ABSTRACT

Examples of shutter assembly are described herein. In an example, the shutter assembly includes an opening having a magnetic rubber-based shutter disposed in the opening. The magnetic rubber-based shutter is slidable along a length of the opening to selectively cover and expose the camera.

15 Claims, 4 Drawing Sheets

(56) References Cited

U.S. PATENT DOCUMENTS

2011/0182029 A1* 7/2011 Wu ................. G03B 11/043
                                                361/679.55
2014/0119718 A1   5/2014 Oh et al.
2015/0059251 A1   3/2015 Rinner et al.
2015/0311941 A1  10/2015 Sorrentino
2016/0161830 A1*  6/2016 Gonzalez Sanchez ...............
                                                H04N 5/2257
                                                396/448
2018/0059510 A1*  3/2018 Gustaveson, II .... H04N 5/2257
2019/0179212 A1*  6/2019 Leimer ............. G03B 11/043

OTHER PUBLICATIONS

Quick-release Plate Materials, 2017, https://photo.stackexchange.com/questions/45935/quick-release-plate-materials.

* cited by examiner

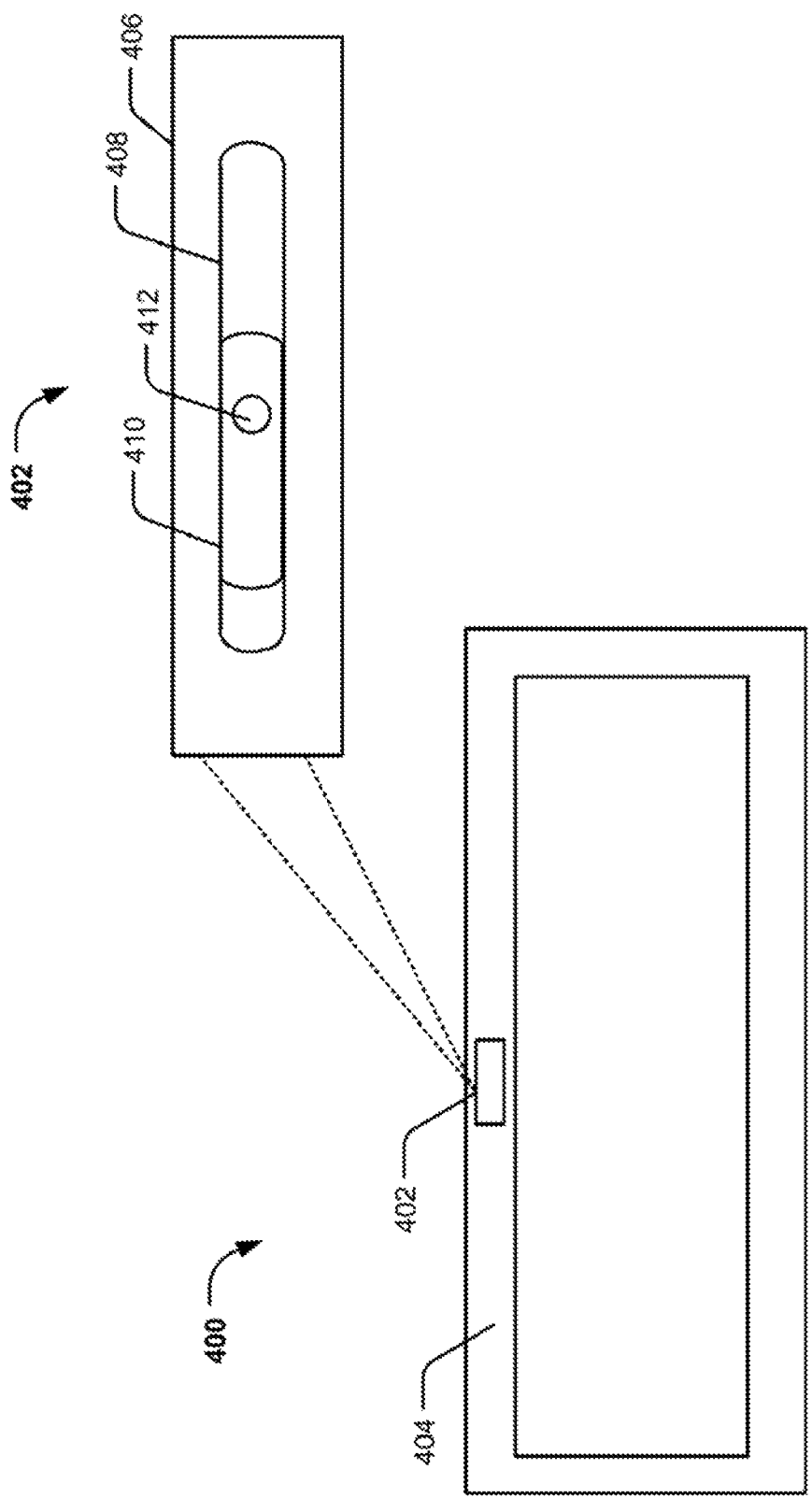

SHUTTER ASSEMBLIES FOR ELECTRONIC DEVICES

BACKGROUND

Electronic devices, such as mobile devices, tablets, and laptops, may include cameras integrated within the electronic devices. The cameras in such electronic devices enable users to take pictures, capture videos, and participate in videoconferences. The cameras may be integrated within a bezel of an electronic device.

BRIEF DESCRIPTION OF DRAWINGS

The following detailed description references the drawings, wherein:

FIG. 4 illustrates a bezel of an electronic device implementing a shutter assembly, according to an example.

DETAILED DESCRIPTION

Figure 1:
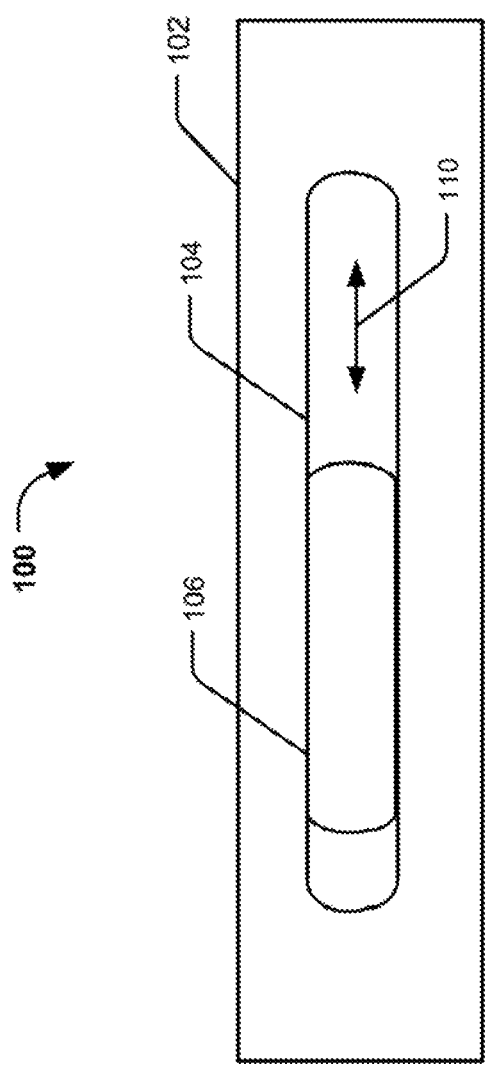
FIG. 1 illustrates a front view of a shutter assembly, according to an example.

Cameras integrated within electronic devices, such as laptops and mobile phones, are susceptible to malware attack. For example, an unauthorised person may access a camera integrated within an electronic device to view or capture video and images of a user, without the user's knowledge. To prevent such unauthorised access, shutters may be deployed in the electronic devices to cover or expose a lens of the camera. A shutter is generally made of thin metallic plate which may be mounted within a housing on a bezel of the electronic devices. The metallic plate may be surface treated, for example, through physical vapor deposition (PVD) and Ultra-violet (UV) painting, before being mounted within the housing.

Further, the shutter may result in scratches on a lens of the camera as well as a surface of the bezel. Moreover, prolonged use of the shutter may cause the metallic plates to bend around its edges. This may cause the edges of the shutter to protrude from the housing. Such protrusion of the edges of the shutter may cause inconvenience while handling the electronic device. In addition, the deformation of the shutter may cause the shutter to fall-off from the housing.

The present subject matter describes shutter assemblies for electronic devices. For example, a shutter assembly may be disposed on a bezel of an electronic device. The bezel surrounds a periphery of a display panel of the electronic device and holds the display panel. In an example, the shutter assembly may include a housing disposable within the bezel. The housing may include an opening adaptable to be fitted onto a camera of the electronic device. Further, the shutter assembly may include a magnetic rubber-based shutter disposed within the housing. In an example, the magnetic rubber-based shutter may include a magnetic material compounded with an elastomer. The magnetic rubber-based shutter may be movable along the opening to selectively cover and expose the camera. For example, the magnetic rubber-based shutter is slidable along a length of the opening to selectively cover and expose the camera.

In an example, the magnetic rubber-based shutter may include an aperture such that the aperture aligns with the camera to expose the camera. The shutter assembly of the present subject matter is cost effective as the magnetic rubber is used without any chemical treatment. Further, the magnetic rubber provides smoothness and flexibility to the shutter, thereby not causing any damage to the lens of the camera. In addition, the magnetic material prevents the magnetic rubber-based shutter from getting deformed. For example, elastic characteristics of the rubber in combination with an attraction induced by a magnetic field created by the magnetic material prevents deformation of the shutter.

The above aspects are further described in conjunction with the following figures and associated description below. It should be noted that the description and figures merely illustrate the principles of the present subject matter. Further, various arrangements may be devised that, although not explicitly described or shown herein, embody the principles of the present subject matter and are included within its scope. The manner in which the systems depicting various implementations of shutter assemblies are explained in detail with respect to FIGS. 1-4.

FIG. 1 illustrates a shutter assembly 100, according to an example. The shutter assembly 100 may be disposed on a bezel (not shown) of an electronic device (not shown in FIG. 1). Examples of the electronic device may include, but are not limited to, a personal computer, a laptop, a mobile phone, a remote control, and a personal digital assistant (PDA). For example, the electronic device may include a camera (not shown) placed behind the bezel to capture an image or a video of a user of the electronic device. The camera may include a video camera, a still camera, or any other type of image capturing device.

The shutter assembly 100 includes a housing 102 that may be disposable within the bezel of the electronic device. The housing may be formed of carbon fiber, metal, or plastic materials. In an example, the bezel may include a groove for accommodating the housing 102 within the groove. Further, the housing 102 includes an opening 104 that is adaptable to be fitted onto the camera of the electronic device. In an example, the opening 104 may be an elongate opening that fits over the camera of the electronic device. For example, the opening 104 is placed in front of the camera such that the camera is visible to a user of the electronic device. The length of the opening 104 may vary based on the electronic device implementing the shutter assembly 100.

Further, the shutter assembly 100 includes a magnetic rubber-based shutter 106 (hereinafter referred to as shutter 106). The shutter 106 is disposed within the housing 102 and is slidable along a length of the opening 104 to selectively cover and expose the camera. For example, the shutter 106 is slidable along the direction of arrow 110. In an example, the shutter 106 is designed as per the opening 104 to enable the shutter 106 to move freely along the opening 104. The user may manually slide the shutter 106 along the opening 104 to expose or cover the camera. Further, the shutter 106 may have a thickness in a range of about 0.2 mm to 0.7 mm.

In an aspect, the shutter 106 may include a magnetic material compounded with an elastomer. For example, the magnetic material added to the elastomer is about 3 weight percent to about 20 weight percent of the elastomer. The magnetic material may be iron, silicon steel, nickel-iron, zinc-iron, molypermalloy, iron-cobalt, ferrite, cobalt-steel, alnico, platinum cobalt, samarium-cobalt, neodymium-iron-boron, cerium-iron-boron, samarium-iron-nitrogen, manganese-bismuth, or a combination thereof.

The elastomer may be polysulfide rubber, polyisoprene, polybutadiene, chloroprene rubber, butyl rubber, styrene-butadiene rubber, nitrile rubber, hydrogenated nitrile rubbers, Ethylene Propylene (EPM) rubber, Ethylene Propylene Diene (EPDM) rubber, Silicone rubber, fluorosilicone rubber, fluoroelastomers, perfluoroelastomers, polyether block amides (PEBA), chlorosulfonated polyethylene, ethylene-vinyl acetate (EVA), thermoplastic urethane, or a combination thereof.

The elastomer provides smoothness and flexibility to the shutter 106, thereby preventing any damage to the camera or the bezel. In addition, the magnetic material of the shutter 106 creates a magnetic field which prevents the shutter 106 from getting deformed and protruding from the housing 102. For example, elastic characteristics of the rubber in combination with an attraction induced by a magnetic field created by the magnetic material prevents deformation of the shutter 106. The shutter 106 may be formed thin enough to allow the electronic device, such as a notebook or a laptop, to be closed with the shutter 106 in place. In an example, the shutter 106 may be made of any color to match a design of the electronic device in which the shutter assembly 100 is being implemented. Details pertaining to the shutter assembly 100 are further described in conjunction with FIG. 2.

Figure 2:
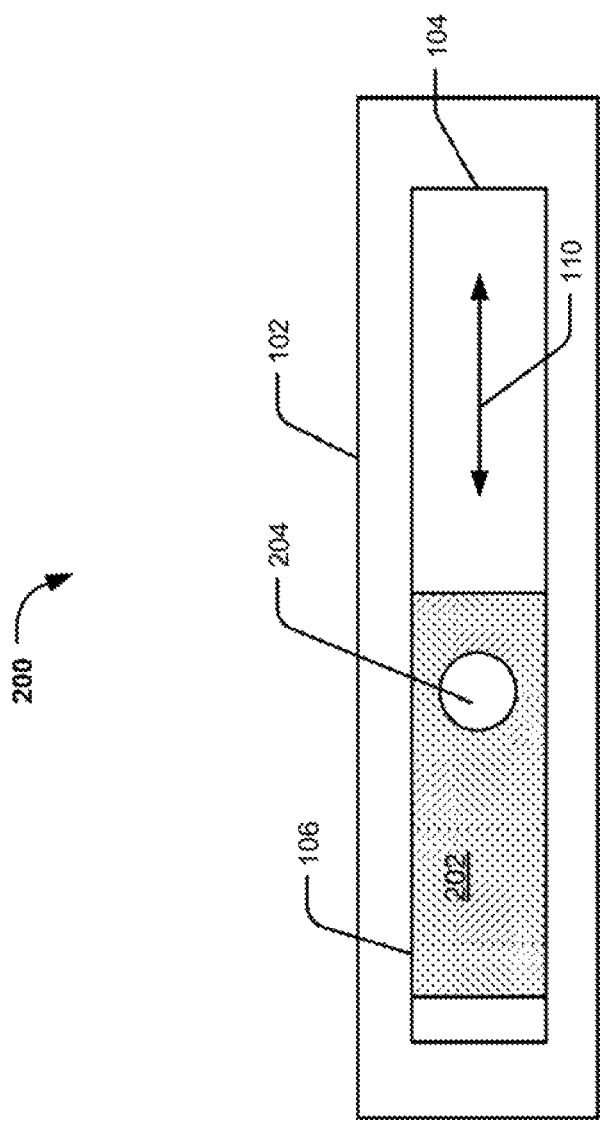
FIG. 2 illustrates a front view of a shutter assembly, according to an example.

FIG. 2 illustrates a shutter assembly 200, according to an example. The shutter assembly 200 includes the housing 102 having the opening 104 such that the opening 104 is adapted to be fitted on a camera of an electronic device. Further, the shutter assembly 200 includes a magnetic rubber-based shutter 106 (hereinafter referred to as shutter 106). The shutter 106 is movable along a length of the opening 104 as depicted by the arrow 110 to selectively cover and expose the camera. For instance, the shutter 106 may be slidable along the opening 104. In an example, the user may manually slide the shutter 106 along the length of the opening 104. In another example, the shutter 106 may slide by means of an actuator (not shown).

As described with reference to FIG. 1, the shutter 106 includes a magnetic material compounded with an elastomer to form a magnetic rubber. In an example, the magnetic rubber undergoes a stamping process. In the stamping process, a sheet of the magnetic rubber is introduced under a stamping press to form a thin layer of the magnetic rubber. Thereafter, a piece is cut from the thin layer of the magnetic rubber. The dimensions, such as a shape, length, and thickness of the piece is based on the electronic device in which the shutter 106 is deployed. Further, any rough edges or surfaces of the magnetic rubber piece are smoothened using a deburring process.

In an implementation, the shutter 106 so formed may be coated with a Teflon film 202 at an outer surface. For example, the Teflon film 202 may be coated by a spray coating technique or an immersing process. In an example, the Teflon film 202 may be attached on the outer surface of the shutter 106 through an adhesive. The Teflon film 202 provides a smooth surface to enable a user to easily slide the shutter 106 along the opening 104. In an example, the Teflon film 202 has a thickness in a range of about 0.02 mm to 0.05 mm. The overall thickness of the shutter assembly 200 is such that the shutter assembly 200 fits in the bezel of the electronic device thereby not causing any inconvenience while handling the electronic device.

Further, the shutter 106 may include an aperture 204. The aperture 204 aligns with the camera to expose the camera. In operation, the user may slide the shutter 106 along the opening 104 to cover the camera of the electronic device. The shutter 106 may obstruct a lens of the camera when not being in use. When the user wants to access the camera, the user may slide the shutter 106 in an opposite direction along the opening 104 such that the aperture 204 aligns with the camera to expose the camera.

Figure 3:
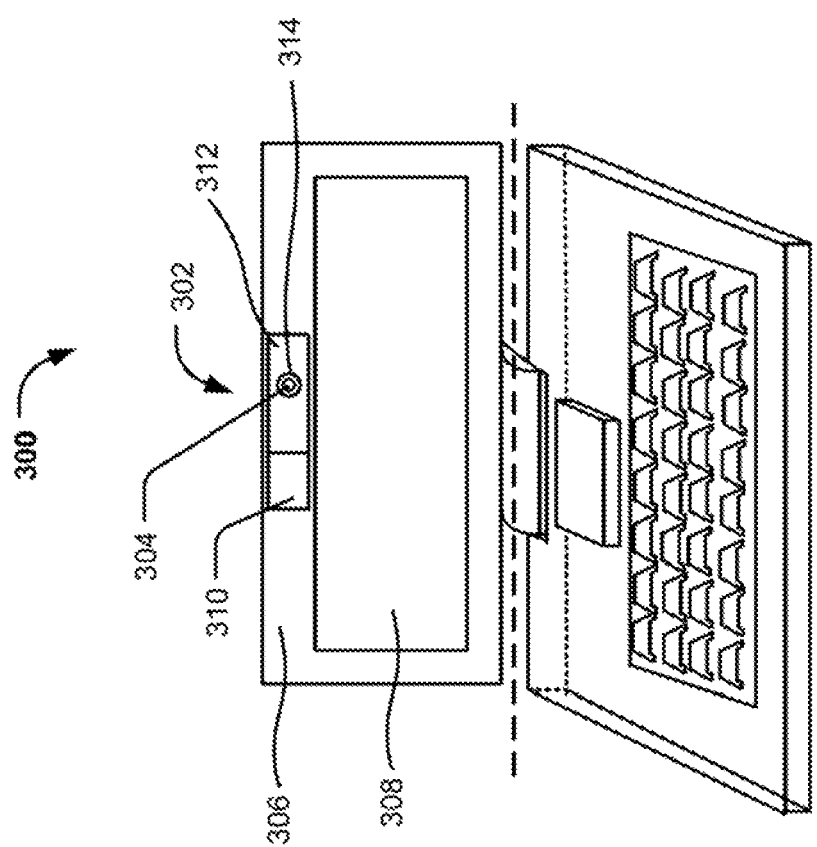
FIG. 3 illustrates an electronic device implementing a shutter assembly, according to an example.

FIG. 3 illustrates an electronic device 300 embedded with a shutter assembly 302, according to an example. In the present example, the electronic device 300 is depicted as a laptop, however, the electronic device 300 may include a personal computer (PC), a smartphone, a tablet, a notebook, a mobile phone, and the like. The electronic device 300 includes a camera 304 integrated within the electronic device 300.

The electronic device 300 further includes a bezel 306 that may be disposed around a display panel 308 of the electronic device 300. In an example, the bezel 306 surrounds a periphery of the display panel 308 of the electronic device 300 and holds the display panel 308. In an example, the bezel 306 may be formed from a metal or a plastic material. Further, the camera 304 is placed behind the bezel 306.

In an example, the shutter assembly 302 is disposed within the bezel 306. The shutter assembly 302 includes an opening 310 such that the opening 310 is fitted onto the camera 304. The opening 310 may be elongated in shape. Further, the shutter assembly 302 of the electronic device 300 includes a magnetic rubber-based shutter 312 (hereinafter referred to as shutter 312) disposed within the opening 310. In an example, the shutter 312 includes a magnetic material compounded with an elastomer. The magnetic material added to the elastomer is about 3 weight percent to about 20 weight percent of the elastomer. The shutter 312 has a thickness in a range of about 0.2 mm to 0.7 mm.

In an aspect, the magnetic material may be iron, silicon steel, nickel-iron, zinc-iron, molypermalloy, iron-cobalt, ferrite, cobalt-steel, alnico, platinum cobalt, samarium-cobalt, neodymium-iron-boron, cerium-iron-boron, samarium-iron-nitrogen, manganese-bismuth, or a combination thereof. The magnetic material creates a magnetic field and thus prevents any deformation of the shutter 312.

The elastomer may be polysulfide rubber, polyisoprene, polybutadiene, chloroprene rubber, butyl rubber, styrene-butadiene rubber, nitrile rubber, hydrogenated nitrile rubbers, Ethylene Propylene (EPM) rubber, Ethylene Propylene Diene (EPDM) rubber, Silicone rubber, fluorosilicone rubber, fluoroelastomers, perfluoroelastomers, polyether block amides (PEBA), chlorosulfonated polyethylene, ethylene-vinyl acetate (EVA), thermoplastic urethane, or a combination thereof. The elastomer provides flexibility and softness to the shutter 312.

In an implementation, the compounded magnetic material and the elastomer is injection molded to form the shutter 312. For instance, during the injection molding, the compounded magnetic material and the elastomer is shaped as per the electronic device in which the shutter 312 may be implemented. In an example, the shutter 312 is made thin so that the shutter 312 remains in-line with the bezel 306 of the electronic device 300.

Further, the shutter 312 is slidable along a length of the opening 310. The movement of the shutter 312 facilitates to selectively cover and expose the camera 304. Thus, the electronic device 300 is protected from any malware attack through the camera 304. In an aspect, the shutter 312 may include an aperture 314 such that the aperture 314 aligns with the camera 304 to expose the camera 304.

FIG. 4 illustrates a bezel 400 of an electronic device, such as the electronic device 300, implementing a shutter assembly 402, according to an example. In an example, the bezel 400 may include any of the shutter assemblies 100, 200, and 302 as explained with reference to FIGS. 1, 2, and 3. In an example, the bezel 400 surrounds a periphery of a display panel of the electronic device and holds the display panel. In an example, the bezel 400 may be formed from a metal or a plastic material.

In an example, the bezel 400 may include a frame 404 to hold the display panel of the electronic device. The frame 404 may be made of any color to match the electronic device. Further, the shutter assembly 402 may be mounted on a top portion of the frame 404. For example, the top portion of the frame 404 may include a camera (not shown). The camera may be placed behind the frame 404.

The shutter assembly 402 may include a housing 406 disposed on the frame 404. In an example, the housing 406 may be disposed, in front of the camera, between a top case (not shown) and the frame 404 of the bezel 400. Further, the housing 406 may include an opening 408. The opening 408 may be an elongate opening that is adaptable to be fitted onto the camera of the electronic device. The length of the opening 408 may vary based on the electronic device implementing the shutter assembly 402.

In an aspect, the shutter assembly 402 may include a magnetic rubber-based shutter 410 (hereinafter referred to as shutter 410) disposed within the housing 406. The shutter 410 may be formed by compounding a magnetic material and an elastomer. In an example, the magnetic material may be iron, silicon steel, nickel-iron, zinc-iron, molypermalloy, iron-cobalt, ferrite, cobalt-steel, alnico, platinum cobalt, samarium-cobalt, neodymium-iron-boron, cerium-iron-boron, samarium-iron-nitrogen, manganese-bismuth, or a combination thereof.

In an example, the shutter 410 is formed by an injection molding technique. In another example, the shutter 410 is formed by stamping a sheet of magnetic rubber and deburring a piece of the stamped sheet to form the shutter 410.

Further, the shutter 410 may include an aperture 412 that aligns with the camera of the electronic device. In an aspect, the shutter 410 is movable along a length of the opening 408 to selectively cover and expose the camera. In an example, the user may manually slide the shutter 410 along the length of the opening 408. In another example, the shutter 410 may slide by means of an actuator (not shown).

In an aspect, the shutter assembly 402 may include a Teflon film (not shown) disposed on the shutter 412. The Teflon film may be coated on an outer surface of the shutter 410 through any known techniques or may be attached to the outer surface of the shutter by an adhesive. The Teflon film provides a smooth finish to the shutter 410 and enables easy sliding of the shutter 412. In an example, the Teflon film has a thickness in a range of about 0.02 mm to 0.05 mm.

Accordingly, the shutter assembly as described above is cost effective as the shutter does not undergo expensive surface treatments. As the shutter is formed of an elastomer, the shutter is soft and thus does not cause any damage to a lens of the camera or to a surface of the bezel. Further, the magnetic material prevents any deformation of the shutter and thus the shutter does not protrude from the housing thereof. In case the shutter protrudes from the housing, the composition of the shutter is such that the shutter acts as a rubber ring between the bezel and a lower case of the electronic device while closing the electronic device.

Although implementations of the shutter assemblies have been described in language specific to structural features and/or methods, it is to be understood that the present subject matter is not necessarily limited to the specific features or methods described. Rather, the specific features and methods are disclosed and explained in the context of a few example implementations of the shutter assemblies.

We claim:

1. A shutter assembly comprising:
   a housing disposable within a bezel of an electronic device, the housing comprising an opening adaptable to be fitted onto a camera of the electronic device; and
   a magnetic rubber-based shutter disposed within the housing, the magnetic rubber-based shutter being slidable along a length of the opening to selectively cover and expose the camera.

2. The shutter assembly as claimed in claim 1, wherein the magnetic rubber-based shutter comprises an aperture, such that the aperture is to align with the camera to expose the camera.

3. The shutter assembly as claimed in claim 1, wherein the magnetic rubber-based shutter comprises a magnetic material compounded with an elastomer.

4. The shutter assembly as claimed in claim 3, wherein the elastomer comprises one of polysulfide rubber, polyisoprene, polybutadiene, chloroprene rubber, butyl rubber, styrene-butadiene rubber, nitrile rubber, hydrogenated nitrile rubbers, Ethylene Propylene (EPM) rubber, Ethylene Propylene Diene (EPDM) rubber, Silicone rubber, fluorosilicone rubber, fluoroelastomers, perfluoroelastomers, polyether block amides (PEBA), chlorosulfonated polyethylene, ethylene-vinyl acetate (EVA), and thermoplastic urethane.

5. The shutter assembly as claimed in claim 3, wherein the magnetic material comprises one of iron, silicon steel, nickel-iron, zinc-iron, molypermalloy, iron-cobalt, ferrite, cobalt-steel, alnico, platinum cobalt, samarium-cobalt, neodymium-iron-boron, cerium-iron-boron, samarium-iron-nitrogen, and manganese-bismuth.

6. The shutter assembly as claimed in claim 1, wherein the magnetic rubber-based shutter has a thickness in a range of about 0.2 mm to 0.7 mm.

7. The shutter assembly as claimed in claim 1, wherein the magnetic rubber-based shutter is coated with a Teflon film.

8. A bezel for an electronic device, the bezel comprising:
   a frame to hold a display panel of the electronic device; and
   a shutter assembly mounted on a top portion of the frame, the shutter assembly comprising:
      a housing having an opening, the opening being adaptable to be fitted onto a camera of the electronic device; and
      a magnetic rubber-based shutter disposed within the housing, the magnetic rubber-based shutter having an aperture, wherein the magnetic rubber-based shutter is slidable along a length of the opening to selectively cover and expose the camera, such that the aperture aligns with the camera to expose the camera.

9. The bezel as claimed in claim 8, wherein the magnetic rubber-based shutter comprises a magnetic material, the magnetic material comprises one of iron, silicon steel, nickel-iron, zinc-iron, molypermalloy, iron-cobalt, ferrite, cobalt-steel, alnico, platinum cobalt, samarium-cobalt, neodymium-iron-boron, cerium-iron-boron, samarium-iron-nitrogen, and manganese-bismuth.

10. The bezel as claimed in claim 8, wherein the magnetic rubber-based shutter is formed by an injection molding technique.

11. The bezel as claimed in claim 8, wherein the shutter assembly further comprises a Teflon film disposed on the magnetic rubber-based shutter.

12. The bezel as claimed in claim 11, wherein the Teflon film has a thickness in a range of about 0.02 mm to 0.05 mm.

13. An electronic device comprising:
a camera integrated with the electronic device;
a bezel disposed around a display panel of the electronic device; and
a shutter assembly disposed within the bezel, the shutter assembly comprising:
an opening fitted onto the camera; and
a magnetic rubber-based shutter disposed within the opening, wherein the magnetic rubber-based shutter is slidable along a length of the opening to selectively cover and expose the camera, and wherein the magnetic rubber-based shutter comprises an aperture, such that the aperture aligns with the camera to expose the camera.

14. The electronic device as claimed in claim 13, wherein the magnetic rubber-based shutter comprises a magnetic material compounded with an elastomer.

15. The electronic device as claimed in claim 13, wherein the magnetic rubber-based shutter has a thickness in a range of about 0.2 mm to 0.7 mm.

\* \* \* \* \*